June 2, 1953

C. L. HOWSE 2,640,217

SOOT BLOWER CONTROL SYSTEM

Filed July 11, 1950

INVENTOR
CURTIS L. HOWSE
By his attorneys
Hoopes, Leonard & Glenn

June 2, 1953  C. L. HOWSE  2,640,217
SOOT BLOWER CONTROL SYSTEM
Filed July 11, 1950  4 Sheets-Sheet 2

INVENTOR
CURTIS L. HOWSE

June 2, 1953 C. L. HOWSE 2,640,217
SOOT BLOWER CONTROL SYSTEM
Filed July 11, 1950 4 Sheets-Sheet 3

INVENTOR
CURTIS L. HOWSE
By his attorneys
Hoopes, Leonard & Glenn

June 2, 1953 C. L. HOWSE 2,640,217
SOOT BLOWER CONTROL SYSTEM
Filed July 11, 1950 4 Sheets-Sheet 4
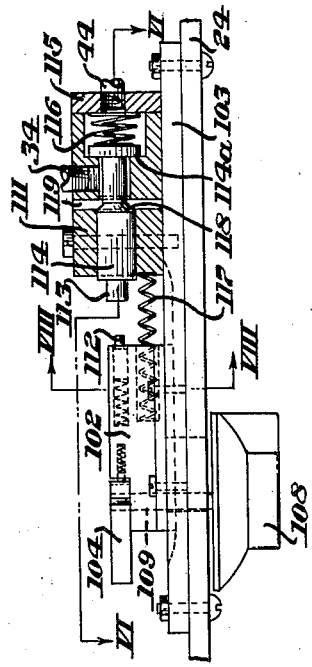
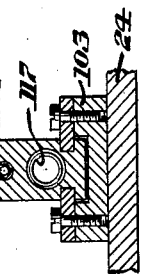
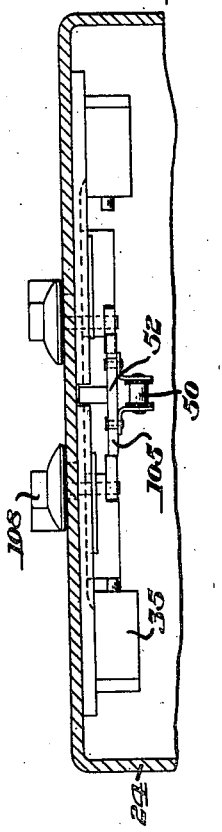
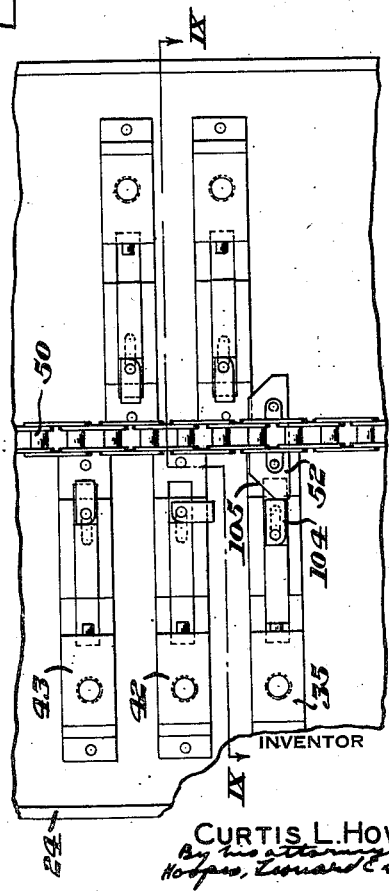
INVENTOR
CURTIS L. HOWSE Patented June 2, 1953

2,640,217

UNITED STATES PATENT OFFICE 2,640,217

SOOT BLOWER CONTROL SYSTEM

Curtis L. Howse, Spartanburg, S. C., assignor to Continental Foundry & Machine Company, East Chicago, Ind., a corporation of Delaware Application July 11, 1950, Serial No. 173,215

8 Claims. (Cl. 15—318)

This invention relates to a control system for soot blowers, especially soot blowers driven by air motors or the like with the operating cycle of each soot blower controlled by a predetermined number of revolutions of the soot blower motor.

The object of the invention is to produce an improved automatic soot blowing system of simple construction and mode of operation. The system of my invention is adapted to control the operation of a series of soot blowers which are each operated by an air motor or the like so that the blowers will be successively operated in a predetermined sequence. The control system starts a blower motor operating and when the motor completes the number of revolutions necessary to move the blower through its cycle the motor is stopped by a means geared to the motor and controlling a valve in the individual fluid supply line of the particular motor. The control system is then reactivated by a flow valve which is interposed in the main fluid supply for the blower motors and which controls the operation of a suitable control motor, preferably electric. This control motor operates to trigger the blower heads successively and finally to switch itself off after all of the blower units have been operated. The control motor preferably moves a travelling finger which successively opens a series of valves each controlling a piston connected to reopen one of the blower motor control valves so as to start the corresponding blower through its cycle. The cycle of the whole group of blowers is repeated at will by restarting the control motor.

Among the advantages of the new control system is that it is adapted to be used with any form of soot blower which has an actuating shaft for moving the blower tube through a desired cycle as the shaft revolves a given number of times, and connected means for synchronizing the operation of the blower valve with the operation of the blower tube. An airmotor or the like, if not already provided, can readily be installed to drive such a shaft and the control system of my invention can then be connected to control the operation of the motor and to integrate the operation of the blower unit with any number of other blower units.

Other novel features, objects and advantages of the invention will become apparent from the following description and in the accompanying drawings. I have shown in the drawings, for purposes of illustration only, the following present preferred embodiment of my invention, in which Figure 1 is a diagram of an automatic system as applied to three blower units;

Figure 6 is a view of one of the blower activators as seen from the rear of the panel (sectioned on the line VI—VI in Figure 7);

Figure 7 is a section taken on the line VII—VII in Figure 6;

Figure 8 is a section taken on the line VIII—VIII in Figure 7;

Figure 9 is a section taken on the line IX—IX in Figure 10; and

Figure 10 is a broken away rear view of the control panel.

Figure 1:
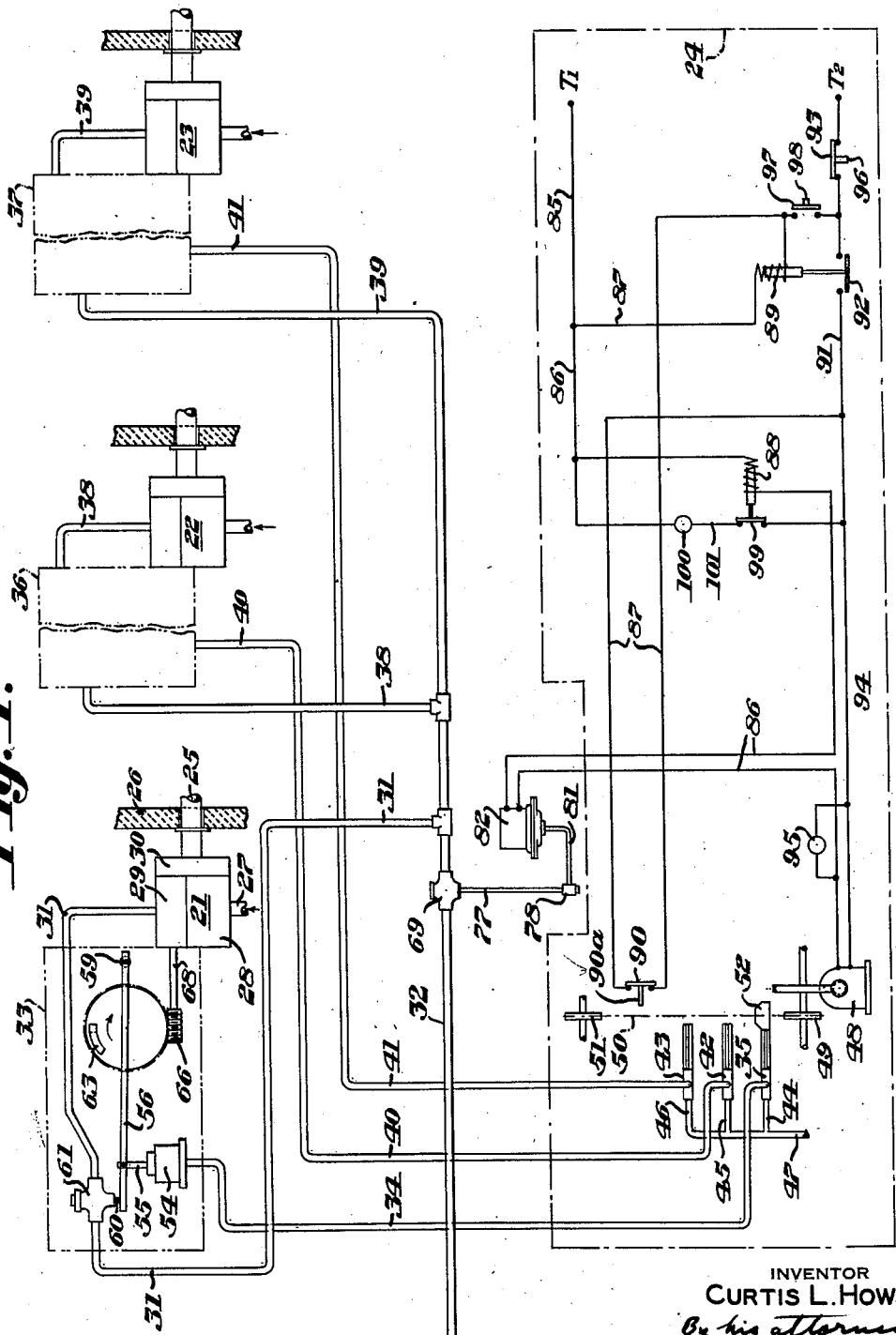

Referring now more particularly to the drawings and considering first the diagram shown in Figure 1, three soot blower units 21, 22 and 23 are shown connected to a central control panel 24. The blower unit 21 has a movable blower tube 25 projecting through a boiler wall 26 to clean the interior of the boiler. A fluid medium for cleaning the boiler is supplied to the tube 25 from a conduit 27 through the blower body 28 in which is mounted a valve (not shown) for controlling the flow to the tube 25. An air motor shown generally at 29 is mounted on the body 28 and moves the tube 25 through gearing indicated at 30. Conventional means (not shown, but exemplified in Patents Nos. 1,995,198 and 2,504,073) connect the valve in the body 28 with the means for moving the tube 25 so that the valve will be closed when the motor is at the beginning and end of its driving cycle but will be opened during the cycle to supply cleaning fluid to the tube 25 as it is moved by the motor 29 and gearing 30.

Compressed air or other fluid under pressure is supplied to the motor 29 through a conduit 31 which is connected to a main compressed air duct 32. An assembly 33 mounted on the body 28 adjacent the motor 29 controls flow through the conduit 31 and is connected by a conduit 34 with an activator 35 mounted on the central control panel 24. The other blower units 22 and 23 have like individual control assemblies 36 and 37 to control flow from duct 32 to the respective blower motors through conduits 38 and 39, with conduits 40 and 41 connecting the assemblies 36 and 37 with individual activators 42 and 43 mounted on the control panel 24. Conduits 44, 45 and 46 supply the activators 35, 42 and 43 with relatively low pressure compressed air from a duct 47 and the said activators controllably release this compressed air into the conduits 34, 40 and 41 to activate the individual control assemblies 33, 36 and 37.

Figure 2:
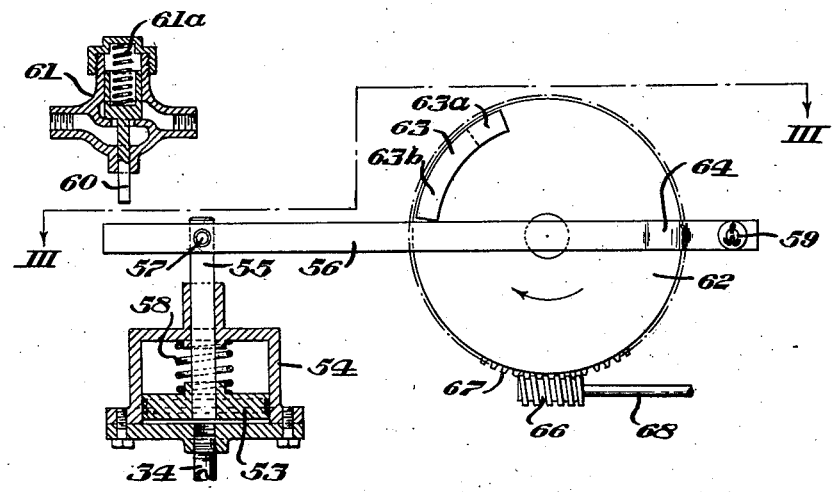
Figure 2 is a partially sectioned view of the control assembly for the motor of one of the blower units.

An electric motor 48 is mounted upon the panel 24 and is geared to drive a sprocket 49 and a chain belt 50 which passes around the sprocket 49 and an idler 51. A finger 52 is mounted on the chain 50 for successively engaging the activators 43, 42 and 35. Additional activators may be added as desired to control additional blower units. When the finger 52 engages the activator 35, for example, compressed air from the duct 47 is released into conduit 34 in a manner hereafter described in more detail. The assembly 33 (Figures 1-3) comprises a piston 53 in a cylinder 54 connected to the conduit 34. The piston 53 is fixed to a rod 55 which projects from the cylinder 54 with the projecting end carrying a pin 57 which extends slidably through an opening in the lever 56. Compressed air from the conduit 34 moves the piston 53 to increase the projection of the piston rod 55 (Figure 1) against the compression spring 58 mounted within the cylinder 54, so that upon release of pressure through the conduit 34 the spring 58 causes the piston rod 55 to return to its retracted position (Figure 2). One end of the lever 56 is pivoted on a fixed stud 59 and the free end of the lever 56 normally is positioned to engage and lift a control rod 60 projecting down from a valve 61 to open the valve 61 against the action of its biasing spring 61a. The valve 61 is interposed in the conduit 31 to control the flow of compressed air to the motor 29, and while the lever 56 presses up on the control rod 60 to hold the valve 61 open the motor 29 is operated by compressed air supplied through the conduit 31 from the duct 32.

Figure 3:
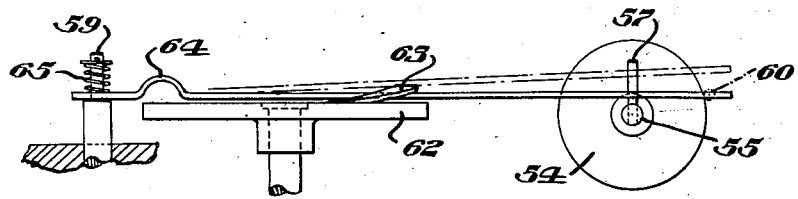
Figure 3 is a view taken from the line III—III in Figure 2 and turned through 180°.

The free end of the lever 56 is slidable along the pin 57 in order to release the control rod 60 while the piston rod 55 is in its raised position. This release occurs when a rotating disk 62 carries a cam 63 against one side of the lever 56. The cam 63 is fixed to the disk 62 at 63a, and forms an inclined cantilever projection therefrom at 63b. The lever 56 is curved outwardly at 64 (Figure 3) to avoid the cam 63 where the cam passes adjacent the lever 56 near the pivot stud 59, but the cam 63 presses against another portion of the side of the lever 56 during each 360° of rotation of the disk 62 and thereby moves the lever 56 horizontally from beneath the control rod 60. When the rod 55 returns to its retracted position the lever 56 is pulled down over the cam 63 by the piston rod 55 and spring 58, and is returned to its original position directly beneath the control rod 60 by means of a compression spring 65 extending around the pivot stud 59 with one end secured to the outer end of the stud and its other end urging the lever 56 horizontally against the piston rod 55. When the piston rod 55 rises again the lever 56 engages the control rod 60, which in the meanwhile has been pressed down again by the spring 61a, before engaging the cam 63, because the lever is able to pass into an open slot between the cantilever raised end of the cam 63 and the adjacent face surface of the disk 62 (Figure 3). The disk 62 is geared to the motor 29 by a worm 66 meshing with teeth 67 around the disk 62 and driven by a shaft 68 driven by the motor 29. The gearing ratio between the disk 62 and the motor 29 is selected so that disk 62 will rotate 360° while the motor 29 drives the blower unit 21 through one complete blowing cycle, and the cam 63 is positioned on the disk 62 so that it will disengage the lever 56 from the rod 60 at the end of the unit blowing cycle.

When one of the individual control assemblies 33, 36 and 37 shuts off the supply of compressed air to the air motor of the particular unit further flow of compressed air through the duct 32 ceases temporarily, and thereupon a flow valve 69 interposed in the duct 32 causes the finger 52 to move the next activator. The flow valve 69 comprises a casing 70 having an inlet 71 and an outlet 72 and a passage therebetween with a valve seat in which is mounted a floating valve 73. The valve 73 has a piston 74 at its upper end loosely fitting in a closed cylindrical cavity at the upper end of the casing 70 and having a pointed end 75 extending downwardly to control the flow through a bleed-off passage 76 in the casing 70 connected to a conduit 77 extending downwardly from the valve 69. While there is a flow of air from the inlet 71 to the outlet 72 the floating valve 73 is lifted from its seat in the casing 70 and the pointed end 75 of the floating valve 73 is thereby lifted to permit a flow of compressed air from the inlet 71 down the bleed-off passage 76 and conduit 77. The conduit 77 is connected to a fitting 78 with a small escape opening 79 and a larger outlet 80 connected through a conduit 81 to the lower end of an electrical pressure switch 82. The pressure switch 82 is of known construction and has a pair of electrical terminals 83 and 84 which are electrically disconnected when there is pressure in the conduit 81 sufficient to actuate a spring pressed diaphragm (not shown) within the pressure switch 82, and which are electrically connected when pressure in the conduit 81 drops below at a predetermined pressure. When there is a flow through the flow valve 69 sufficient to raise the valve 73 the escape of air through the bleed-off passageway 76 is sufficient to maintain pressure in the conduit 81 to disconnect the terminals 83 and 84. When the flow through the flow valve 69 ceases the pointed valve end 75 closes the escape passage 76 and the small orifice 79 in the fitting 78 permits the pressure in the conduit 81 to drop until the terminals 83 and 84 become connected.

The pressure switch 82 controls the operation of the electric motor 48 for moving the finger 52 into successive engagement with the activators 35, 42 and 43 (Figure 1). The motor 48 is connected to a suitable source of electric power through a circuit having a pair of main terminals $T^1$—$T^2$. The terminal $T^1$ is connected to the motor 48 through a line 85 having branches 86 and 87. The branch 86 is connected to one terminal of the motor 48 through a solenoid coil 88 and the pressure switch terminals 83 and 84. The branch 87 is connected through a solenoid coil 89 and switch 90 to a line 91 connected to the terminal $T^2$ through switches 92 and 93. The other terminal of the motor 48 is connected by a line 94 to the line 91 between the switches 90 and 92, and a light 95 is connected in parallel with the motor 48 across branch 86 and line 94 to indicate when the motor 48 is operating. The switch 90 is spring biased closed and is opened when a projection 90a thereon is engaged by the travelling finger 52; the switch 92 is spring biased open and is closed by the solenoid in coil 89 when that coil is energized; and the switch 93 is spring biased closed and is opened by a manually operated button 96 (in Figure 1 the switches are shown in their biased positions). The branch 87 is conected between the solenoid 89 and the switch 90 through a switch 97 to the line 91 between the switches 92 and 93. The swtch 97 is spring biased open and is closed manually to a button 98. The coil 88 energizes a solenoid to open a switch 99 which is spring biased closed. The switch 99 is connected in series with a light 100 in a line 101 which is connected at one end to the branch 86 between line 85 and coil 88, and at the other end is connected to the line 94, so that the light 100 will be turned on as an indicator while each blower unit is in operation.

The operation of the electrical circuit is as follows, starting from the beginning of each cycle of operation of the whole series of blower units: At the beginning of the whole cycle the travelling finger 52 is at rest in engagement with the extension 90a holding the switch 90 open. The whole cycle is started by pressing the button 98 of the starting switch 97, which energizes the coil 89 and thereby closes the switch 92. The terminals of the pressure switch 82 are connected because the finger 52 is not operating any of the activators 35, 42 or 43 and consequently there is no flow through the valve 69 for opening the terminals of the pressure switch 82. Under these conditions current flows from the terminal $T^1$ through the line 85 and branch 86 through the pressure switch 82 to the motor 48 and thence through line 94 and through the closed switches 92 and 93 to the terminal $T^2$. This energizes the light 95 to indicate that the motor is operating, but the light 100, which is out initially because the switch 92 is open, remains out after switch 92 closes because the motor current through the branch 86 energizes the coil 88 and opens the switch 99. The power supplied to the motor 48 causes the motor to drive the belt 50 and thus to move the finger 52 off of the extension 90a so that the switch 90 becomes closed. The button 98 may now be released and current for holding the switch 92 closed flows from the line 85 and branch 87 through the switch 90 to the line 91 and thence through switches 92 and 96 to the terminal $T^2$. The motor 48 continues to operate under these conditions and the finger 52 is thereby brought around the sprocket 49 against the activator 35. This connects the duct 47 and conduit 34 to open the motor valve 61 of the blower unit 21, which starts a flow through the valve 69 in the manner described above. The flow through the valve 69 causes the pressure switch 82 to interrupt the circuit through the branch 86, and this stops the motor 48 and also de-energizes the coil 88 to close the switch 99. Since the switch 99 is closed, current continues to flow along the line 85 and branch 87 to energize the coil 89 and hold the switch 92 closed while the blower unit 21 completes its cycle. At the same time, the coil 88 is de-energized and as a result the switch 99 closes and the light 100 is turned on to indicate that a blower unit is operating. While the motor 48 is switched off its parallel indicating light 95 is turned out as an indication that the motor 48 is not operating. When the blower unit 21 completes its cycle the motor valve 61 is closed in the manner previously described, and the resultant stoppage of flow through the flow valve 69 has the effect of connecting the terminals of the pressure switch 82 so that the motor 48 is again energized. The closing of the circuit through the pressure switch 82 re-energizes the coil 88 and opens the switch 99 to turn out the light 100, and the light 95 is switched on with the motor 48. The motor 48 then moves the finger 52 to the next unit, and the same operation of the electrical control system is repeated for each unit having an activator engageable by the finger 52 until the finger 52 at last engages the projection 90a and again opens the switch 90. This stops the cycle because the opening of the switch 90 de-energizes the coil 89 and permits the switch 92 to open, thereby cutting off the motor 48 and the lights 95 and 100. Pressing the button 98 of the starting switch 97 starts the whole cycle over again. Pressing the button 96 of the stopping switch 93 permits the switch 92 to open during any portion of the cycle so that the finger 52 will not move on to the next unit after the blowing cycle of the last unit has been completed. When the cycle of the whole system has been interrupted by the stopping switch 93 the cycle may be resumed by pressing the button 98 of the starting switch 97.

The construction of the activators 35, 42 and 43 is illustrated in detail in Figures 6–10. The activator 35, for example, has a block 102 slidably mounted on a base 103 secured to the panel 24. A finger-engaging element 104 is pivotally mounted on the sliding block 102 so that when the element 104 is extended outwardly from the sliding block it will be engaged by the finger 52, which has an inclined cam surface 105 for wedging the element 104 and the sliding block 102 away from the path of the chain 50. The element 104 has one square corner 106 engaging an opposite shoulder of the sliding block 102 to prevent the element 104 from rotating during engagement with the finger 52, and has a rounded corner 107 to permit the element 104 to be rotated 90° out of the path of finger 52 when it is desired to omit the blower unit 21 from the operating cycle of the automatic system. This turning movement is accomplished by means of a button 108 on the outside of the panel 24. A pin 109 is journaled in the block 102 and is keyed at its opposite ends to the element 104 and to the button 108 to transmit rotational and sliding movement therebetween. The pin 109 extends through slots in the base 103 and panel 24 so that it can move laterally with the block 102. A spring pressed detent 110 is mounted in the sliding block 102 and is engageable in small notches in the element 104 when the latter is in its finger-engaging and nonfinger-engaging positions, respectively, in order to provide convenient click stops.

The sliding block 102 is movable by the finger 52 against a valve block 111 mounted on the base 103. A spring pressed button 112 projecting from the sliding block 102 is engageable with an integral projection 113 of a double-acting valve element 114 slidable in the block 111. At the other end of the block 111 a cap 115 presses a spring 116 against the other end of the valve element 114, thereby seating a shoulder 114a of the valve element 114 in the block 111 and preventing passage of compressed air from the conduit 44 through an opening in the cap 115 and thence through the block 111 into the conduit 34. A compression spring 117 normally biases the blocks 102 and 111 apart but when the finger 52 engages the element 104 the button 112 is brought against the projection 113 of the valve element 114 to unseat the valve element 114 and thereby permit passage of compressed air from the conduit 44 into the conduit 34. The valve element 114 has a second valve shoulder 118 which is biased open in the block 111 to permit a backflow of compressed air through the conduit 34 past the valve shoulder 118 and out of the block 111 through escape channels 119. When the sliding block 102 moves the valve element 114 to open the passage between the conduits 44 and 34, the valve shoulder 118 becomes seated and thereby prevents any escape of compressed air from the conduit 44 through the escape channels 119. The release of air from the conduit 34 through the escape channels 119 when the conduit 44 is disconnected from the conduit 34 permits the piston 53 (Figure 2) to lower the lever 56 after the cam 63 has released the lever 56 from the valve extension 60, so that the lever 56 can reposition itself beneath the valve extension 60 for the next operation of the blowing unit 21. On the other hand, while the finger 52 holds the button 112 of the sliding block 102 against the extension 113 of the valve element 114, the valve shoulder 118 prevents the escape of compressed air supplied to the piston 53 through the conduit 34 and thereby holds the lever 56 up against the valve extension 60 to keep the air motor 29 operating until the cam 63 disengages the lever 56 from the valve extension 60.

Figure 4:
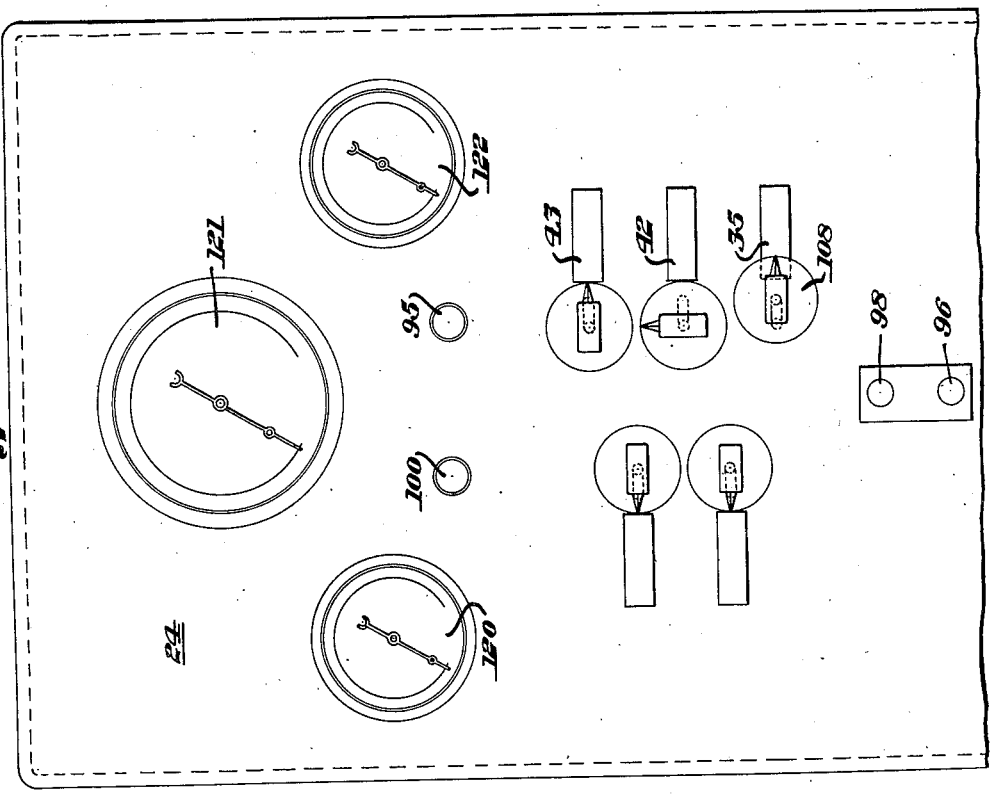
Figure 4 is a view of the front face of the central control panel, partially broken away.
Figure 5:
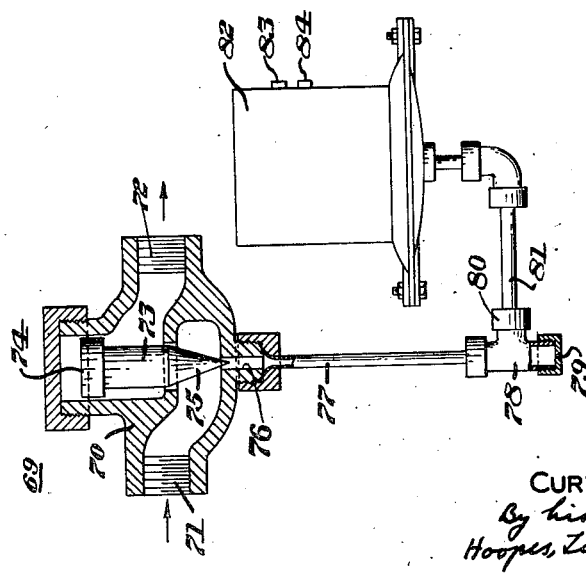
Figure 5 is a partially sectional view of the flow valve and pressure switch of the system shown in Figure 1.

The front face of the panel 24 presents the principal signal and control elements for inspection and operation (Figure 4). Dials 120, 121 and 122 indicate the pressure in the blower motor air duct 32, in the cleaning fluid lines (e. g., 27), and in the panel air duct 47, respectively, and the lights 95 and 100 are mounted on the panel to show whether the panel motor 48 or any of the blower units are operating. The buttons for the activators 35, 42 and 43 give a further indication of whether any unit is operating because when the finger 52 moves the sliding block of any activator the button is carried with the sliding block and by its displacement indicates that the corresponding blower unit is being operated (see button 108 in Figure 4, block 102 in Figure 10, and blower unit 21 in Figure 1). The angle of the buttons connected to the sliding blocks of the activators 35, 42 and 43 also indicate whether the corresponding activator has its finger-engaging element in active position (see activators 35 and 43 in Figure 4) or in inactive position (see activator 42 in Figure 4).

While I have illustrated and described a present preferred embodiment of the invention and have shown certain present preferred methods of practicing the same it will be recognized the invention is not limited thereto but may be otherwise variously embodied and practiced within the scope of the following claims.

I claim:

1. An automatic sequential soot blowing system comprising a plurality of soot blowers, a motor connected to drive each blower through its soot blowing cycle, a common duct connected to supply driving fluid to the respective motors, a flow-responsive valve interposed in said duct and a switch controlled by said valve in response to flow therethrough, a member mounted to travel in a predetermined path, driving means connected to said member and controlled by said switch to halt the travelling member when there is flow through the duct and to move the travelling member when the flow stops, a valve connected to each motor to control the flow of driving fluid therethrough, and a plurality of means successively actuated by said travelling member and connected to the respective motor valves for successively opening the motor valves as the travelling member successively actuates said means, and means for closing each motor valve at the end of a cycle of the corresponding soot blower, whereby the travelling member stops while there is flow through the duct to any soot blower motor and moves on the actuate the next of said successively actuated means, thus opening the motor valve of another soot blower, as soon as the valve of the first-mentioned soot blower is closed and flow through the common supply duct is thereby stopped.

2. An automatic sequential soot blowing system comprising a plurality of soot blowers, a motor connected to drive each blower through its soot blowing cycle, a common duct connected to supply driving fluid to the respective motors, a flow-responsive valve interposed in said duct, a fluid pressure operated switch having a fluid conduit connection with said valve whereby the switch is controlled by said valve in response to flow therethrough, a member mounted to travel in a predetermined path, driving means connected to said member and controlled by said switch to halt the travelling member when there is flow through the duct and to move the travelling member when the flow stops, a valve connected to each motor to control the flow of driving fluid thereto, and a plurality of means successively actuated by said travelling member and connected to the respective motor valves for successively opening the motor valves as the travelling member successively actuates said means, and means geared to each motor for closing each motor valve at the end of a cycle of the corresponding soot blower, whereby the travelling member stops while there is flow through the duct to any soot blower motor and moves on to actuate the next of said successively actuated means, thus opening the motor valve of another soot blower, as soon as the valve of the first-mentioned soot blower is closed and flow through the common supply duct is thereby stopped.

3. An automatic soot blower unit comprising a soot blower, a fluid-driven motor connected to drive the soot blower through a blowing cycle determined by the number of revolutions of the motor, a valve controlling the supply of driving fluid to said motor, and means to operate the valve comprising biasing means yieldably urging the valve closed, a member movably mounted to engage the valve when it is closed and to move the valve to its open position against the action of the biasing means, and a cam geared to the motor and mounted to be driven by the motor against said member to release it from the valve and thus allow the valve to close after a predetermined number of revolutions of the motor, whereby said member serves to open the valve and start the motor at the beginning of the blower cycle, and the cam and biasing means serve to stop the motor after a predetermined number of revolutions thereof which move the blower through a desired cycle.

4. An automatic sequential soot blowing system comprising a plurality of soot blowers, a motor connected to drive each blower through its soot blowing cycle, a common duct connected to supply driving fluid to the respective motors, a flow-responsive valve interposed in said duct and a switch controlled by said valve in response to flow therethrough, a member mounted to travel in a predetermined path, driving means connected to said travelling member and controlled by said switch to halt the member when there is flow through the duct and to move the travelling member when the flow stops, a valve connected to each motor to control the flow of driving fluid therethrough, biasing means for each motor valve yieldingly urging it closed, means to open each motor valve against the action of the biasing means, a cam geared to each motor and mounted to disengage the corresponding motor valve opening means while the valve is held open thereby, whereby the motor is stopped after a predetermined number of revolutions thereof which drive the connected blower through a desired cycle, and a plurality of means disposed to actuate the respective motor valve opening means and to be successively actuated by the said travelling member to cause the motor valves to open successively, whereby the travelling member causes a motor valve to open, halts while there is flow through the common duct to the soot blower motor controlled by the valve, and moves on to start the next motor when the cam geared to the previous motor causes the motor valve to close and thereby stops the flow of driving fluid through the supply duct.

5. An automatic soot blower system in accordance with claim 4 in which the several means disposed to actuate the respective motor valve opening means, and disposed to be successively actuated by the travelling member to cause the motor valves to open successively, each comprises a fluid actuated piston, a piston rod actuated by the piston, a member movably mounted on the piston rod, biasing means urging said member into a position to be moved by the piston rod to open the corresponding motor valve, the cam geared to each motor being mounted to move said member out of said position while holding the motor valve open and thereby to permit the motor valve to close, a duct connected to supply actuating fluid to the piston, a control valve interposed in said duct, biasing means yieldably urging said control valve closed, and means engageable by the travelling means to open said control valve and thereby to open the corresponding motor valve until the cam geared to the motor operates to close the motor valve.

6. A powered soot blower unit comprising a soot blower, a motor connected to drive the soot blower, a duct connected to supply driving fluid to the motor, a valve controlling the flow of said driving fluid to the motor, means to open the motor valve comprising a fluid operated piston engageable with the motor valve to open it, a conduit for fluid under pressure connected to the piston, a valve operable to supply the fluid under pressure to the piston and to release fluid from the piston, and a sliding block controlling the piston valve, and panel control means comprising a panel having a rear face mounting the sliding block and a slot through the panel adjacent the sliding block, and a control button on the opposite panel face connected through the slot in the panel with the sliding block, whereby lateral displacement of the button on the panel accompanies and indicates the turning on and turning off of the blower motor.

7. An automatic soot blower system comprising a plurality of soot blowers, a motor connected to drive each soot blower, a common duct connected to supply driving fluid to the respective motors, a valve controlling the flow of said driving fluid to each motor, means yieldably biasing each motor valve closed, means to open each motor valve and hold it open comprising a fluid operated engageable with each motor valve to open it, a conduit for fluid under pressure connected to the pistons, a valve operable to supply the fluid under pressure to each piston and to release fluid freely from the piston, biasing means urging each piston valve into position to release fluid from the piston, and a member movable to and from different positions for moving and holding the respective piston valves against their biasing means and thereby operating the respective pistons to open and hold open the motor valves successively, means to disengage each piston from the motor valve which it is holding open after operation of the corresponding soot blower by the connected motor, and means responsive to reduced flow of driving fluid to the motors to move said travelling means from one piston valve to another.

8. An automatic sequential soot blowing system comprising a plurality of soot blowers, a motor to drive each blower through its soot blowing cycle, a common duct connected to supply driving fluid to the respective motors, a flow-responsive valve in said duct, a control valve in each branch of the duct connected to each of said motors to control the supply of driving fluid thereto, means operable to open each control valve individually, means yieldably biasing each control valve into closed position, a sequential operating system for actuating the respective control valve opening means to open the control valves successively, power means to operate said sequential system, said power means being controlled by said flow-responsive valve to be inoperative when there is flow through said flow-responsive valve and operative when there is no flow therethrough, and means driven by each motor to release the associated control valve from the associated opening means and thus permit closing said control valve, whereby when no motor is operating the flow-responsive valve starts the sequential system to open the control valve of the next soot blower to start it through its cycle, thereby starting a flow through the duct which causes the flow-responsive valve to stop the sequential system until the then operating motor actuates the means to close the associated control valve, thus stopping that motor and causing the flow-responsive valve to initiate the starting of the next motor.

CURTIS L. HOWSE.

References Cited in the file of this patent

UNITED STATES PATENTS

| Number | Name | Date |
|---|---|---|
| 2,230,113 | Hein | Jan. 28, 1941 |
| 2,327,524 | Hibner | Aug. 24, 1943 |

FOREIGN PATENTS

| Number | Country | Date |
|---|---|---|
| 529,306 | Great Britain | Nov. 19, 1940 |